United States Patent
Leupolz et al.

(10) Patent No.: US 6,259,549 B1
(45) Date of Patent: Jul. 10, 2001

(54) LAMINATED GLASS PANE ASSEMBLY WITH ELECTRICALLY CONTROLLABLE REFLECTANCE AND METHOD OF MAKING SAID ASSEMBLIES

(75) Inventors: Andreas Leupolz, Horgenzell; Monika Golly, Immenstaad; Thomas Kränzler, Salem; Werner Scherber, Bermatingen, all of (DE)

(73) Assignee: Dornier GmbH, Friedrichshafen (DE)

( * ) Notice: Subject to any disclaimer, the term of this patent is extended or adjusted under 35 U.S.C. 154(b) by 0 days.

(21) Appl. No.: 09/389,385

(22) Filed: Sep. 3, 1999

(30) Foreign Application Priority Data

Sep. 3, 1998 (DE) ................................. 198 40 186

(51) Int. Cl.$^7$ .................................................. G02F 1/153
(52) U.S. Cl. .......................... 359/270; 359/265; 359/268; 359/269; 359/275
(58) Field of Search ..................... 359/265–275

(56) References Cited

U.S. PATENT DOCUMENTS

| | | | | |
|---|---|---|---|---|
| 3,843,232 | * | 10/1974 | Berets | 359/275 |
| 4,146,309 | * | 3/1979 | Singh et al. | 359/265 |
| 4,174,152 | | 11/1979 | Giglia et al. | 359/270 |
| 4,550,982 | * | 11/1985 | Hirai | 359/274 |
| 5,206,756 | * | 4/1993 | Cheshire | 359/270 |
| 5,663,829 | | 9/1997 | Lefrou et al. | 359/275 |
| 5,905,590 | * | 5/1999 | Van Der Sluis et al. | 359/275 |
| 5,970,187 | * | 10/1999 | Notten et al. | 385/16 |
| 6,063,522 | * | 5/2000 | Hamrock et al. | 429/200 |
| 6,101,298 | * | 8/2000 | Den Broeder et al. | 385/16 |

FOREIGN PATENT DOCUMENTS

| | | |
|---|---|---|
| 3629879C2 | 3/1987 | (DE) . |
| 0574791A2 | 12/1993 | (EP) . |
| WO 95/31746 | 11/1995 | (EP) . |
| WO 98/10329 | 3/1998 | (EP) . |
| 07043753A | 2/1995 | (JP) . |
| WO 93/04507 | 3/1993 | (WO) . |

* cited by examiner

Primary Examiner—Georgia Epps
Assistant Examiner—Evelyn A. Lester
(74) Attorney, Agent, or Firm—Evenson, McKeown, Edwards & Lenahan, P.L.L.C.

(57) ABSTRACT

A laminated glass pane assembly with electrically controllable reflectivity, especially for controlling the entry of sunlight and solar heat into vehicles or buildings. The laminated glass pane comprises a first glass pane, an electroreflective functional layer made of an alloy of the hydride of a rare earth metal and magnesium, an antioxidation layer made of a proton-conducting transparent oxide or fluoride, an anhydrous proton-conducting solid electrolyte, a proton storage layer, a transparent conducting coating, and a second glass pane.

29 Claims, 1 Drawing Sheet

LAMINATED GLASS PANE ASSEMBLY WITH ELECTRICALLY CONTROLLABLE REFLECTANCE AND METHOD OF MAKING SAID ASSEMBLIES

BACKGROUND AND SUMMARY OF THE INVENTION

This application claims the priority of German application 198 40 186.8, filed Sep. 3, 1998, the disclosure of which is expressly incorporated by reference herein.

The invention relates to a laminated glass pane assembly with electrically controllable reflectance, especially for controlling the entry of sunlight and solar heat into vehicles or buildings.

Pane assemblies with controllable transparency are known for example from German Patent Document DE 36 29 879 C2. The disadvantage of this electrochromic pane assembly is that the transmission is controlled by coloration, i.e., by an absorptive operating mechanism. In the colored state, the solar irradiation is absorbed in the coloring layer and therefore, as desired, does not pass directly into the glazed space. However, as a result of the absorption, the pane itself heats up significantly. This results in an undesired time-delayed indirect heating of the space located behind the glass.

One possibility for controlling the reflectance of thin-film assemblies is described in WO 96/38758. The functional layer consists of a rare earth metal hydride layer with a catalyst cover layer. The switching of the reflection is based on the reversible change of the state of hydration of the layer between a metallic highly reflective dihydride phase and a semiconducting trihydride phase with very low reflection. The switching process is triggered by a catalytic gas reaction with gas containing hydrogen. In this type of control, a double pane with a space in between is required, with the optical properties of the functional layer being switched by changing the gas concentration in the space between the panes. Triggering the switching process into the transparent state requires providing or generating a gas containing hydrogen which is conducted into the space between the panes. The reverse reaction into the reflective state can be accomplished for example by flooding the space with air. However, making this a closed assembly is a difficult process. Another disadvantage of this assembly is that a catalyst layer must be made of a metal such as palladium in order to produce the necessary atomic hydrogen from the molecular hydrogen. This catalyst layer limits the maximum possible optical transmission of the entire assembly to 40 percent. These transmission values are insufficient for many applications. Thus for example 70–75 percent transmission is necessary for motor vehicle applications.

The possibility of electrically controlling these functional layers was previously described only as a laboratory experiment (Notten et al., J. Electrochem. Soc., Vol. 143, No. 10, Oct. 1996). The switching process is triggered in an individual layer by the electrolytic decomposition of an alkaline aqueous electrolyte. For a reversibly switchable closed element, this design is not advantageous since the decomposition of the electrolyte occurs irreversibly with the development of a gas.

To increase the reflection values in the visible spectrum, the material of the functional layer described in WO 96/38758 can be alloyed with magnesium (P. van der Sluis, M. Ouwerkerk, P. A. Duine, App. Phys. Lett., 70 (25), 3356 (1997)).

WO 98/10329 A1 describes an optical switching arrangement with the following layer structure:

a glass pane;

an electroreflective functional layer made of an alloy of the hydride of a rare-earth metal and magnesium;

a catalytically active layer that can operate simultaneously as an antioxidation layer made of metals such as palladium or compounds of the $AB_2$, $AB_3$ type whose transparency is relatively low (for example, the transparency of palladium is only about 35 to 40 percent);

a proton-conducting solid electrolyte;

a proton storage layer; and a transparent conducting coating.

European Patent Document EP 0 574 791 A2 teaches a polymer electrolyte membrane made of sulfonated polyether ketones for use in fuel cells.

In Japanese Patent Document JP 07-043 753 A an electrochromic cell is described for controlling the incidence of light through a window in which a tantalum oxide layer is provided to protect the electrochromic functional layer against contact with the organic electrolyte.

A goal of the invention is to provide a laminated glass pane that can be switched reversibly in the visible range (especially in the wavelength range between 300 and 800 nm) between highly transparent and reflective states over many switching cycles by applying a low electrical control voltage.

The laminated glass pane assembly according to preferred embodiments of the invention has the following layer structure:

a first glass pane;

an electroreflective functional layer consisting of an alloy of the hydride of a rare earth metal and magnesium;

an antioxidation layer consisting of a proton-conducting transparent oxide or fluoride;

an anhydrous proton-conducting solid electrolyte;

a proton storage layer;

a transparent conducting coating; and a second glass pane.

A laminated glass pane assembly according to the invention functions as follows: when an electrical voltage, typically 2 volts, is applied to the transparent conducting coating and to the functional layer so that the minus pole of the voltage source is connected to the functional layer, positively charged protons migrate from the proton storage layer through the solid electrolyte to the functional layer and are neutralized there, creating atomic hydrogen. By a reversible chemical reaction, the atomic hydrogen is stored in the functional layer so that the material of the functional layer changes from a metallic highly reflective state to a semiconducting state with low reflectivity. If the polarity of the electrical voltage is reversed so that the positive pole is connected to the functional layer, protons form and migrate back into the storage layer through the electrolyte. The functional layer is consequently changed back again to a material with a metallic nature. The catalyst layer of the electroreflective functional layer can be eliminated, which is necessary in the known method of gas control since the proton is reduced at the surface to atomic hydrogen which can diffuse directly into the functional layer.

Therefore, the laminated glass pane assembly according to the invention can be switched reversibly under electrical control between a state of high transmission and a state of high reflectivity. Consequently it is possible to regulate the entry of heat into glazed spaces very effectively. At high levels of solar irradiation, overheating of the object is prevented by reflection at the pane. When warming or light is desired, the pane can be switched to the transparent state which makes possible a high degree of transparency to the solar irradiation.

In the laminated glass pane according to the invention with controlled reflectivity, the pane itself remains cool mainly by reflecting the solar radiation energy. As a result, the degree to which energy penetrates the glazing can be regulated very effectively even under long-term irradiation.

Since the functional layer also forms an electrode for electrical control, a homogeneous extensive and rapid switching process is made possible.

Due to the fact that the functional layer is very close to the outside surface within the laminated structure, the assembly achieves a high degree of efficiency.

With the laminated glass pane according to the invention, reversible switching can be achieved over a number of switching cycles. Only low switching energies of less than 1 Wh/m$^2$ are required for the switching process.

The laminated glass pane assembly according to the invention can be used in particular as glazing for windows of vehicles or buildings. It can also be used however to control light, for example, in headlight assemblies.

The electoreflective functional layer according to the invention consists of an alloy of the hydrides of a rare earth metal, especially yttrium, gadolinium and samarium, and magnesium. The term "electroreflective" in this application describes a layer whose reflectivity can be changed under electrical control. The percentage of rare earth metal or metals preferably is in the range of 20 to 80 percent, for example $Y_{30}Mg_{70}$. In the case of yttrium, the reversible switching takes place between the metallic dihydride phase $YH_2$ and the semiconducting trihydride phase $YH_3$.

The atomic hydrogen required for the switching process is stored in the storage layer as a proton.

Metal oxides, for example cathodically coloring electrochromic layers including in particular tungsten oxide ($WO_3$) are very well suited for proton storage. When the protons migrate out of the functional layer into such an electrochromic storage layer, they color the latter, such as blue in the case of $WO_3$. Since this effect is undesired for many applications, it may be advantageous to modify the electrochromic layer in such fashion that only a slight coloration is produced by the proton storage. This is achieved by mixing the tungsten oxide with titanium oxide ($TiO_2$).

Other materials that are suitable for the proton storage layer are $MoO_3$, $Nb_2O_5$ and $V_2O_5$.

The transport of the protons between the storage layer and the electroreflective functional layer takes place through a proton-conducting solid electrolyte. This electrolyte must be anhydrous in order to prevent any damage to the water-sensitive electroreflective functional layer. In one advantageous embodiment, the electrolyte consists of an oligomer or a polymer of sulfonated polyether ketones (PEK, PEEK) with a mobile proton carrier such as imidazole or pyrazole.

In another embodiment, the electrolyte consists of a copolymer of a acrylamidopropane sulfonic acid (AMPS) and another (meth)acrylic derivative, and mobile proton carriers such as imidazole or pyrazole. Especially advantageous is when methoxypolyethyleneglycol(n) monomethacrylate where n=4 to 13, preferably n=9, is used as the (meth)acrylic derivative where n is the number of ethyleneglycol units.

Other objects, advantages and novel features of the present invention will become apparent from the following detailed description of the invention when considered in conjunction with the accompanying drawings.

DETAILED DESCRIPTION OF THE DRAWINGS

Figure 1:
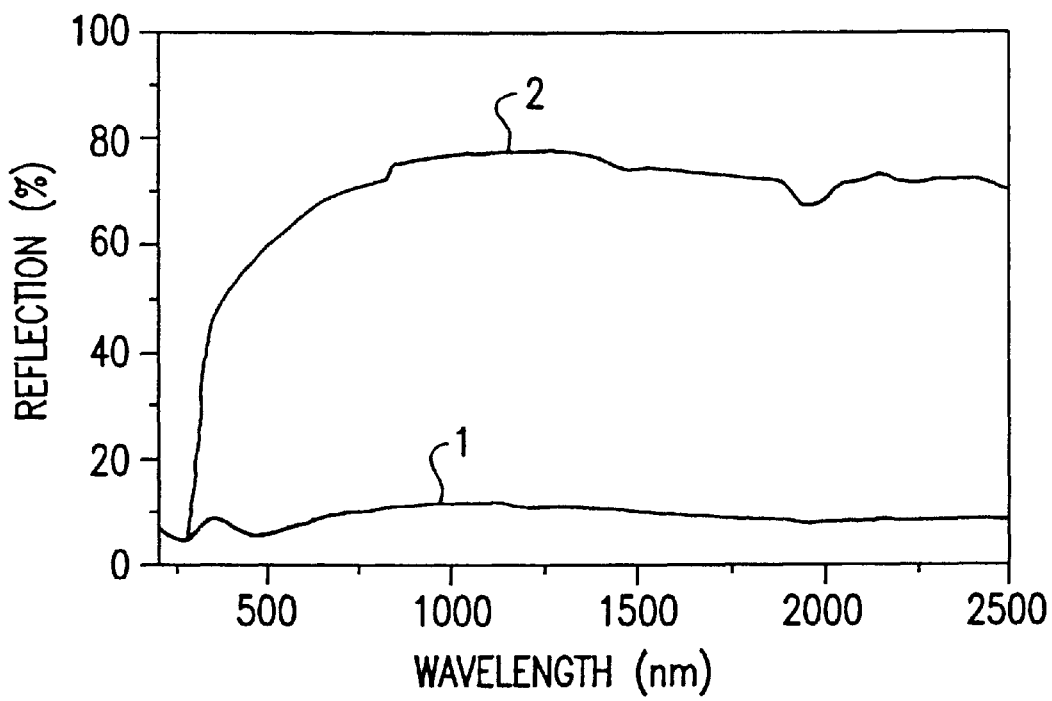
FIG. 1 shows the reflecting behavior of an alloy layer used in preferred embodiments of the present invention, shown in the two switch states.

In FIG. 1 the reflecting behavior of an alloy layer approximate 70 nm thick made of yttrium with an approximately 50 percent alloy content of magnesium is shown. One branch 1 of the curve shows the behavior in the semiconducting state in which the laminated glass pane is essentially transparent. The other branch 2 shows the behavior in the metallic state in which the laminated glass pane is highly reflective. It is clear from the graph that the switching effect can be achieved at wavelengths of approximately 300 nm and the visible range of the electromagnetic spectrum is completely covered.

Figure 2:
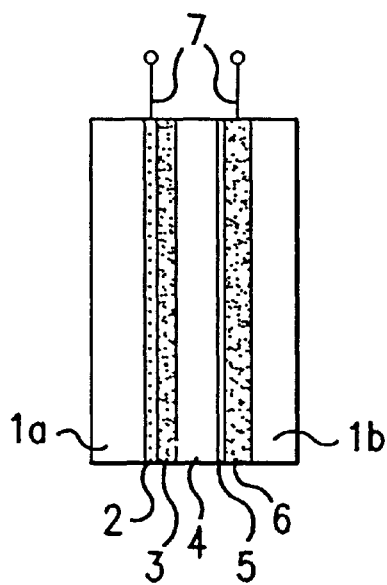
FIG. 2 is a sectional view of a laminated glass pane assembly constructed according to preferred embodiments of the present invention.

FIG. 2 shows an embodiment of the laminated glass pane assembly according to the invention. It comprises a pair of glass panes 1a, 1b with the following layers:

an electroreflective functional layer 6;

an antioxidation layer 5;

an anhydrous proton-conducting solid electrolyte 4;

a proton storage layer 3; and a transparent conducting coating 2.

When used as intended, the glass pane 1b faces the radiation whose penetration is to be prevented. When used as an automobile windshield the glass pane 1b may be the outer pane.

The electroreflective functional layer 6 made of an alloy of the hydrides of a rare earth metal and magnesium can be applied to the glass pane 1b in a high vacuum by a physical vapor deposition (PVD) method (e.g. vacuum evaporation or sputtering). In order to prevent oxidation of functional layer 6 upon removal from the vacuum apparatus and during subsequent finishing, a transparent ion-permeable antioxidation layer 5 is applied while the high vacuum is maintained. According to the invention, the preferred antioxidation layer contains proton-conducting oxides such as niobium oxide ($Nb_2O_5$), vanadium oxide ($V_2O_5$) or tantalum oxide, or fluorides such as magnesium fluoride ($MgF_2$) or lead fluoride ($PbF_2$). These materials exhibit high transparency and therefore permit high transmission values in the transparent switching state. The functional layer 6 can be hydrated either as a reactive process directly during manufacture or as a subsequent electrochemical reaction in an electrolyte (for example using a KOH solution).

The second glass pane 1a is provided with a transparent conductivity layer 2, for example ITO (Indium Tin Oxide), and coated with a proton storage layer 3. The latter ensures the necessary stability of the assembly in which the atomic hydrogen required for the switching process is stored in the proton storage layer as a proton. The charging of the layer with protons is accomplished electrochemically, for example, using a sulfuric acid electrolyte in the case of tungsten oxide.

Especially advantageous for this process of proton charging is the use of an anhydrous electrolyte such as trifluoroacetic acid. This prevents the water produced from the charging process which adheres to the layer from entering the next layer, especially the water-sensitive functional layer 6.

It has been found that it is also possible to charge the storage layer from aprotic solvents such as propylene carbonate with lithium ions instead of for example protons without adversely affecting the cell function.

To make the laminated glass pane assembly according to the invention, the two glass panes 1a, 1b are adhered together with a transparent conductivity layer 2, a proton storage layer 3, a transparent proton-conducting electrolyte 4, an antioxidation layer 5 and electroreflective functional layer 6 in between the two panes. The proton transport takes place between storage layer 3 and electroreflective functional layer 6. The electrolyte can be attached when the laminated glass pane is manufactured by producing an electrolyte film, placing it between the glass panes and then attaching it at an elevated temperature and pressure.

Another embodiment comprises making a cell out of the coated glass panes, filling the cell with an electrolyte in liquid form, and then curing it using heat or UV light. The mechanical properties of the solid polymer electrolyte ensures good mechanical stability of the entire assembly with corresponding laminated glass properties.

As shown in FIG. 2, the assembly is provided with contacts by means of an electrode 2 adjacent to the proton storage layer 3 and by an electrode 7 for the functional layer 6.

Figure 3:
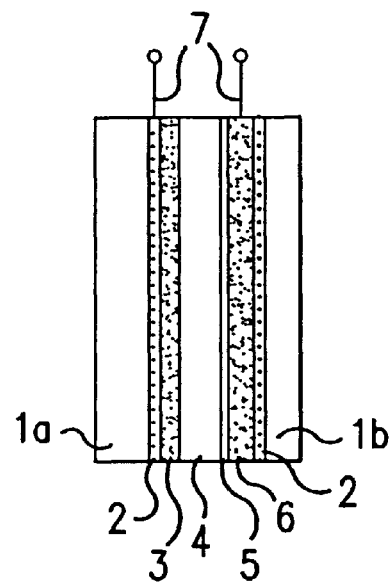
FIG. 3 is a sectional view of a laminated glass pane assembly constructed according to another preferred embodiment of the present invention.

FIG. 3 shows another embodiment of the invention where a separate electrode 7, made of for example ITO, can be provided for contact between functional layer 6 and first glass pane 1b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A laminated glass pane assembly with electrically controllable reflectivity, especially for regulating the entry of sunlight and solar heat into vehicles and buildings, comprising the following structures disposed adjacent to one another:
   a first glass pane;
   an electroreflective functional layer consisting of an alloy of the hydride of a rare earth metal and magnesium;
   an antioxidation layer consisting of a proton-conducting transparent oxide or fluoride;
   an anhydrous proton-conducting solid electrolyte;
   a proton storage layer;
   a transparent conducting coating; and
   a second glass pane.

2. The laminated glass pane assembly of claim 1, further comprising a second transparent conducting coating between the first glass pane and the electroreflective functional layer.

3. The laminated glass pane assembly of claim 1, further comprising a pair of electrodes with an electric current supply operable to provide executing control current to the assembly.

4. The laminated glass pane assembly of claim 1, wherein the anhydrous proton-conducting solid electrolyte consists of an oligomer or a polymer of sulfonated polyether ketones with a mobile proton carrier.

5. The laminated glass pane assembly of claim 2, wherein the anhydrous proton-conducting solid electrolyte consists of an oligomer or a polymer of sulfonated polyether ketones with a mobile proton carrier.

6. The laminated glass pane assembly of claim 1, wherein the anhydrous proton-conducting solid electrolyte consists of a copolymer of an acrylamidopropane sulfonic acid and another (meth)acrylic derivative with a mobile proton carrier.

7. The laminated glass pane assembly of claim 2, wherein the anhydrous proton-conducting solid electrolyte consists of a copolymer of an acrylamidopropane sulfonic acid and another (meth)acrylic derivative with a mobile proton carrier.

8. The laminated glass pane assembly of claim 6, wherein the (meth)acrylic derivative is methoxypolyethyleneglycol (n)monomethacrylate where n=4 to 13 ethyleneglycol units.

9. The laminated glass pane assembly of claim 7, wherein the (meth)acrylic derivative is methoxypolyethyleneglycol (n)monomethacrylate where n=4 to 13 ethyleneglycol units.

10. The laminated glass pane assembly of claim 1, wherein the proton storage layer consists of a metal oxide.

11. The laminated glass pane assembly of claim 10, wherein the metal oxide is a cathodically coloring electrochromic material.

12. The laminated glass pane assembly of claim 11, wherein the cathodically coloring electrochromic material is $WO_3$, $MoO_3$, $Nb_2O_5$, or $V_2O_5$.

13. The laminated glass pane assembly of claim 1, wherein the proton storage layer consists of an alloy of tungsten oxide and titanium oxide.

14. The laminated glass pane assembly of claim 2, wherein the proton storage layer consists of an alloy of tungsten oxide and titanium oxide.

15. The laminated glass pane assembly of claim 1, wherein the antioxidation layer consists of niobium oxide, tantalum oxide, vanadium oxide, magnesium fluoride or lead fluoride.

16. The laminated glass pane assembly of claim 1, wherein the hydrides of the rare earth metals is selected from the group consisting of yttrium, gadolinium and samarium.

17. A laminated glass pane assembly with electrically controllable reflectivity for regulating the entry of sunlight and solar heat into vehicles and buildings, comprising:
   a first glass pane;
   an electroreflective functional layer consisting of an alloy of the hydride of a rare earth metal and magnesium;
   an antioxidation layer consisting of a proton-conducting transparent oxide or fluoride;
   an anhydrous proton-conducting solid electrolyte;
   a proton storage layer;
   a transparent conducting coating; and
   a second glass pane.

18. A method for making a laminated glass pane assembly with electrically controllable reflectivity, comprising:
   applying an electroreflective functional layer consisting of an alloy of the hydride of a rare earth metal and magnesium to a first glass pane;
   applying an antioxidation layer consisting of a proton-conducting transparent oxide or fluoride to the electroreflective functional layer;
   providing a second glass pane with a transparent conductivity coating;
   applying a transparent conductivity coating with a proton storage layer;
   providing an anhydrous proton-conducting solid electrolyte between the proton storage layer and the antioxidation layer;
   attaching an electrode to the transparent conductivity coating and to the electroreflective functional layer; and
   adhering the two glass panes together so that said coating and layers are between the glass panes.

19. The method of claim 18, further comprising providing the first glass pane with a transparent conductivity coating.

20. The method of claim 18, wherein the anhydrous proton-conducting solid electrolyte consists of an oligomer or a polymer of sulfonated polyether ketones with a mobile proton carrier.

21. The method of claim 18, wherein the anhydrous proton-conducting solid electrolyte consists of a copolymer of an acrylamidopropane sulfonic acid and another (meth)acrylic derivative with a mobile proton carrier.

22. The method of claim 21, wherein the (meth)acrylic derivative is methoxypolyethyleneglycol (n) monomethacrylate where n=4 to 13 ethyleneglycol units.

23. The method of claim 18, wherein the proton storage layer consists of a metal oxide.

24. The method of claim 23, wherein the metal oxide is a cathodically coloring electrochromic material.

25. The method of claim 24, wherein the cathodically coloring electrochromic material is $WO_3$, $MoO_3$, $Nb_2O_5$, or $V_2O_5$.

26. The method of claim 18, wherein the proton storage layer consists of an alloy of tungsten oxide and titanium oxide.

27. The method of claim 18, wherein the antioxidation layer consists of niobium oxide, tantalum oxide, vanadium oxide, magnesium fluoride or lead fluoride.

28. The method of claim 18, wherein the hydrides of the rare earth metals is selected from the group consisting of yttrium, gadolinium and samarium.

29. A method of controlling radiation through a multiple glass paned assembly, comprising:
   applying an electroreflective functional layer consisting of an alloy of the hydride of a rare earth metal and magnesium to a first glass pane;
   providing a second glass pane with a transparent conductivity coating;
   applying a transparent conductivity coating with a proton storage layer;
   providing an anhydrous proton-conducting solid electrolyte between the proton storage layer and the antioxidation layer;
   adhering the two glass panes together so that said coating and layers are between the glass panes;
   decreasing the reflectivity of the assembly by activating the proton storage layer to release positively charged protons that migrate to the functional layer which decreases the reflective state of properties of the functional layer with the capability of increasing the reflectivity by activating the functional layer to form the protons that migrate to the proton storage layer.

* * * * *